US012748584B2

(12) United States Patent
Zhang et al.

(10) Patent No.: US 12,748,584 B2
(45) Date of Patent: Sep. 29, 2026

(54) CONTROLLER SOFTWARE ARCHITECTURE, CONTROLLER SOFTWARE UPGRADE METHOD, CONTROLLER, AND APPARATUS

(71) Applicant: Yinwang Intelligent Technologies Co., Ltd., Shenzhen (CN)

(72) Inventors: Xinlong Zhang, Shanghai (CN); Quan Li, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 18/511,105

(22) Filed: Nov. 16, 2023

(65) Prior Publication Data

US 2024/0095016 A1 Mar. 21, 2024

Related U.S. Application Data

(63) Continuation of application No. PCT/CN2021/093991, filed on May 16, 2021.

(51) Int. Cl.
*G06F 9/44* (2018.01)
*G06F 8/65* (2018.01)

(52) U.S. Cl.
CPC .................................... *G06F 8/65* (2013.01)

(58) Field of Classification Search
CPC ........................................................ G06F 8/65
USPC ......................................... 717/168; 171/168
See application file for complete search history.

(56) References Cited

U.S. PATENT DOCUMENTS 6,272,136 B1 * 8/2001 Lin .......................... H04L 49/90 370/396
6,314,501 B1 * 11/2001 Gulick ...................... G06F 9/54 711/209
6,999,998 B2 * 2/2006 Russell ................. G06F 15/167 709/213
7,861,127 B2 * 12/2010 Yamashita .......... G06F 11/0793 714/39

(Continued)

FOREIGN PATENT DOCUMENTS

CN 1688136 A * 10/2005
CN 102170478 B 2/2014

(Continued)

OTHER PUBLICATIONS

Autosar:"Classic Platform Release Overview", Classic Platform Release Overview Autosar CP Release 4.4.0, (Oct. 31, 2018), total 39 pages.

(Continued)

*Primary Examiner* — Evral E Bodden
(74) *Attorney, Agent, or Firm* — Conley Rose, P.C.

(57) ABSTRACT

A controller software architecture includes: a driver layer, an interface layer, an application layer, and a global buffer. The interface layer is configured to exchange data with the application layer through the global buffer, and the interface layer is further configured to exchange data with the driver layer through the global buffer. In this way, data exchange between the interface layer and the application layer and data exchange between the interface layer and the driver layer can be implemented through the global buffer, thereby developing a controller.

20 Claims, 7 Drawing Sheets

(56) References Cited

U.S. PATENT DOCUMENTS

| | | | | |
|---|---|---|---|---|
| 10,002,036 | B2 | 6/2018 | Fuchs et al. | |
| 2003/0120769 | A1* | 6/2003 | McCollom | H04L 45/38 709/224 |
| 2008/0258758 | A1* | 10/2008 | Kaizu | G06F 11/1068 714/724 |
| 2012/0226820 | A1* | 9/2012 | Li | H04L 67/1001 709/242 |
| 2025/0310247 | A1* | 10/2025 | Wang | H04L 45/745 |

FOREIGN PATENT DOCUMENTS

| | | | |
|---|---|---|---|
| CN | 104360834 | B | 1/2018 |
| CN | 104331305 | B | 2/2018 |
| CN | 108228185 | A | 6/2018 |
| CN | 108897564 | A | 11/2018 |
| CN | 111258550 | A | 6/2020 |

OTHER PUBLICATIONS

"ASAM MCD-1 (XCP) Universal Measurement and Calibration Protocol", Version 1.5.0, Date: Nov. 30, 2017, total 312 pages.

Autosar, "Layered Software Architecture," Autosar R20-11, Nov. 30, 2020, XP055901843, 171 pages.

* cited by examiner

CONTROLLER SOFTWARE ARCHITECTURE, CONTROLLER SOFTWARE UPGRADE METHOD, CONTROLLER, AND APPARATUS

CROSS-REFERENCE TO RELATED APPLICATIONS

This is a continuation of International Patent Application No. PCT/CN2021/093991 filed on May 16, 2021, the disclosure of which is hereby incorporated by reference in its entirety.

TECHNICAL FIELD

This application relates to the field of information technologies, more specifically, to a software architecture, a software upgrade method, and a software running method and apparatus, and particularly, to a controller software architecture, a controller software upgrade method, a controller, and an apparatus that are for an electronic device installed in a vehicle such as an intelligent vehicle (smart/intelligent car).

BACKGROUND

With the development of society, increasingly more machines in modern life are developing towards automation and intelligence, and vehicles used for mobile travel are no exception. Intelligent vehicles are gradually entering people's daily life, which benefits from development of a system that implements an electronic control function in a vehicle. Currently, the system that implements the electronic control function in the vehicle mainly includes an electronic control element, for example, an electronic control unit (ECU). As a part located inside the vehicle, the electronic control unit has the electronic control function. For example, the ECU may control a vehicle part based on control information. For another example, the ECU may perform data processing on to-be-transmitted data in a vehicle part.

Currently, most underlying software architectures in the automotive field are Automotive Open System Architecture (AUTOSAR), Open Systems and Their Interfaces for the Electronics in Motor Vehicles (OSEK) architectures, or Vehicle Distributed executive (VDX) architectures. These underlying software architectures each have a framework that covers service requirements of some chips, all hardware, all underlying software logic, and all application layers. Such a large and comprehensive framework causes a large quantity of parameters to be configured. For example, underlying software of one ECU configured with up to tens of thousands of parameters, and a team including dozens of to hundreds of persons is required to develop the software. In a word, a development threshold is high and a test workload is heavy. In addition, a configuration tool needs to be purchased to develop these underlying software architectures. In an aspect, the configuration tool needs to be separately bound to a chip and a compiler, resulting in poor reusability. In another aspect, the configuration tool is expensive.

Currently, the underlying software architecture in the automotive field may be developed in the following two manners.

One manner is to develop the underlying software architecture in the automotive field based on post-build. The post-build can implement reusability of underlying software to a specific extent. There are two types of post-build: "post-build loadable" and "post-build selectable". In the "post-build loadable", a configuration parameter that needs to be changed is stored in a flash area. When a function needs to be changed, the configuration parameter in the flash area is updated by refreshing a program. However, refreshing a program requires code recompilation, and a quantity of configuration parameters that can be updated is limited. In the "post-build selectable", a plurality of configuration parameters that need to be changed are stored in a flash area. When the ECU is powered on (which may be understood as "connected to a power supply"), a configuration parameter in the flash area may be selected and loaded based on an external situation. Before compiling is performed in the "Post-build selectable", a changed configuration parameter needs to be stored in the flash area. When the changed configuration parameter is not a configuration parameter stored in the flash area, all code needs to be refreshed, and flexibility is poor.

The other manner is to modify, without compiling, a configuration parameter in underlying software based on calibration in a Universal Measurement and Calibration Protocol (XCP). However, the XCP needs to fix a physical address of a configuration item. When a requirement changes, types of and a quantity of configuration items cannot be changed. For example, at delivery, the ECU is configured to support reception of 100 Controller Area Network (CAN) signals, and this configuration cannot be changed, through the XCP, to "receiving 101 CAN signals".

SUMMARY

This application provides a controller software architecture, a controller software upgrade method, a controller, and an apparatus, to develop a controller.

According to a first aspect, a controller software architecture is provided, including: a driver layer, an interface layer, an application layer, and a global buffer. The interface layer is configured to exchange data with the application layer through the global buffer, and the interface layer is further configured to exchange data with the driver layer through the global buffer.

For example, a controller may include a controller that is developed based on a microcontroller unit (MCU) and that uses an operating system running on a read-only memory (ROM).

A field to which the controller is applied is not limited in this embodiment of this application. For example, the controller may be applied to the automotive field. For example, the controller may include an ECU, a vehicle interface unit (VIU), and the like.

According to the controller software architecture provided in this embodiment of this application, data exchange between the interface layer and the application layer and data exchange between the interface layer and the driver layer can be implemented through the global buffer, thereby developing a controller.

With reference to the first aspect, in some implementations of the first aspect, the interface layer is further configured to: the interface layer is configured to perform a first target operation based on a parameter value of a target signal; the interface layer is further configured to buffer a result of the first target operation into the global buffer based on a storage address of the target signal in the global buffer; and the application layer is further configured to obtain the result of the first target operation.

For example, the parameter value of the target signal includes but is not limited to a collection periodicity value, a number of a channel for transmitting the target signal is transmitted, a collection mode of the target signal, and the like.

For example, a sampling mode may be understood as information that needs to be collected. For example, the sampling mode may include collecting an input frequency, collecting a duty cycle, and collecting data on a rising edge/falling edge.

For example, the target signal may be transmitted through an analog-to-digital converter (ADC), an input capture unit (ICU), a digital input driver (DI), a digital output driver (DO), an H bridge, a Local Interconnect Network (LIN), a CAN, and/or an Ethernet controller driver (ETH).

For example, the first target operation may be collecting the target signal, and a result of the first target operation may be the collected target signal.

The interface layer performs the first target operation based on the parameter value of the target signal, and buffers the result of the first target operation into the global buffer based on the storage address of the target signal in the global buffer. Then, the application layer obtains the result of the first target operation. In this way, a solution in which the interface layer writes the result of the first target operation into the global buffer, and the application layer reads the result of the first target operation from the global buffer is implemented, so that the controller can implement a corresponding function, thereby completing development of the controller.

With reference to the first aspect, in some implementations of the first aspect, the interface layer is further configured to read configuration data, where the configuration data includes the parameter value of the target signal and the storage address of the target signal in the global buffer.

With reference to the first aspect, in some implementations of the first aspect, the application layer is further configured to read the result of the first target operation from the global buffer based on the address of the target signal in the global buffer.

With reference to the first aspect, in some implementations of the first aspect, the application layer is further configured to read the configuration data, where the configuration data includes the parameter value of the target signal and the storage address of the target signal in the global buffer.

With reference to the first aspect, in some implementations of the first aspect, the application layer is further configured to: the application layer is configured to perform a first target operation based on a parameter value of a target signal; the application layer is further configured to buffer a result of the first target operation into the global buffer based on a storage address of the target signal in the global buffer; and the interface layer is further configured to obtain the result of the first target operation.

The application layer performs the first target operation based on the parameter value of the target signal, and buffers the result of the first target operation into the global buffer based on the storage address of the target signal in the global buffer. Then, the interface layer obtains the result of the first target operation. In this way, a solution in which the application layer writes the result of the first target operation into the global buffer, and the interface layer reads the result of the first target operation from the global buffer is implemented, so that the controller can implement a corresponding function, thereby completing development of the controller.

With reference to the first aspect, in some implementations of the first aspect, the application layer is further configured to read configuration data, where the configuration data includes the parameter value of the target signal and the storage address of the target signal in the global buffer.

With reference to the first aspect, in some implementations of the first aspect, the interface layer is further configured to read the result of the first target operation from the global buffer based on the address of the target signal in the global buffer.

With reference to the first aspect, in some implementations of the first aspect, the interface layer is further configured to read the configuration data, where the configuration data includes the parameter value of the target signal and the storage address of the target signal in the global buffer.

With reference to the first aspect, in some implementations of the first aspect, the interface layer is further configured to perform a second target operation based on the result of the first target operation.

With reference to the first aspect, in some implementations of the first aspect, the result of the first target operation includes a collected target signal, and the second target operation includes forwarding the target signal; or the result of the first target operation includes a target output value, the target output value is a changed output value of a target driving channel at the driver layer, and the second target operation includes changing an output value of the target driving channel to the target output value.

With reference to the first aspect, in some implementations of the first aspect, the controller software architecture further includes a flash programming layer, where the flash programming layer is configured to: obtain a machine code, and flash the machine code into a storage memory of the controller to modify the configuration data.

With reference to the first aspect, in some implementations of the first aspect, the interface layer further includes a management plane function, and the management plane function is configured to monitor a running status of the interface layer, so that when the interface layer runs abnormally, the interface layer takes an exception response measure.

With reference to the first aspect, in some implementations of the first aspect, the interface layer further includes an initialization function, and the initialization function is configured to initialize a communication parameter used during running of the interface layer.

With reference to the first aspect, in some implementations of the first aspect, the application layer further includes a data plane function, and behavior of the data plane function is determined by the configuration data.

With reference to the first aspect, in some implementations of the first aspect, the controller software architecture further includes a basic software layer (BSW), and the interface layer is located in a communication service of the BSW.

According to a second aspect, a controller is provided. A software architecture of the controller is the controller software architecture according to the first aspect or any one of some implementations of the first aspect.

With reference to the second aspect, in some implementations of the second aspect, the controller includes a first memory. The first memory is a running memory of the controller, and a global buffer of the first memory is used to buffer data generated during running of the controller.

With reference to the second aspect, in some implementations of the second aspect, the controller includes a second memory, the second memory is a storage memory of the controller, and the second memory is configured to store configuration data.

According to the controller provided in this embodiment of this application, hardware of the controller does not need to be improved, and only dozens of pieces of configuration data need to be flashed into the storage memory of the controller. In this way, the controller can directly read the configuration data from the storage memory of the controller, and read, from the running memory of the controller based on the configuration data, running data corresponding to the configuration data, to develop a function of the controller. Therefore, an amount of configuration data required to complete development of the controller can decrease from hundreds to a few dozen, thereby reducing a workload of controller development, reducing development costs of the controller, and increasing a development speed of the controller.

According to a third aspect, a controller software upgrade method is provided. A storage memory of a controller stores configuration data, the configuration data is data related to a function of the controller, and the method includes: reading the configuration data; and performing, based on the configuration data, an operation corresponding to the configuration data.

With reference to the third aspect, in some implementations of the third aspect, the configuration data includes a parameter value of a target signal and a storage address of the target signal in the controller.

With reference to the third aspect, in some implementations of the third aspect, the reading the configuration data includes: reading the configuration data when the controller is started or restarted.

The configuration data is read when the controller is started or restarted, that is, the configuration data is loaded each time the controller is started, to dynamically load the configuration data.

According to a fourth aspect, a controller software upgrade method is provided, and the method includes: obtaining configuration data, where the configuration data is related to a function of a controller; and generating a machine code based on the configuration data, where the machine code is used to upgrade the controller.

The configuration data related to the function of the controller is obtained and the machine code is generated, to upgrade the controller.

With reference to the fourth aspect, in some implementations of the fourth aspect, the method further includes: flashing the machine code into a storage memory of the controller.

With reference to the fourth aspect, in some implementations of the fourth aspect, the obtaining configuration data includes: obtaining a user instruction, where the user instruction indicates at least one of the following: adding one or more pieces of configuration data, deleting one or more pieces of configuration data, and modifying one or more pieces of configuration data.

With reference to the fourth aspect, in some implementations of the fourth aspect, the obtaining a user instruction includes: obtaining the user instruction based on an operation performed by a user in a human-computer interaction interface of software.

When the user needs to change the function of the controller, the user does not need to improve hardware of the controller and does not need to perform compiling (that is, compiling-free) the hardware of the controller either, and the user only needs to input corresponding configuration data by using an operation in the human-computer interface of the software, so as to flexibly upgrade the controller. Therefore, an amount of configuration data required to complete development of the controller can decrease from hundreds to a few dozen, thereby reducing a workload of controller development, reducing development costs of the controller, and increasing a development speed of the controller.

According to a fifth aspect, a storage method is provided, and the method includes: dividing a storage area of a second memory into N storage areas, where N is a positive integer greater than or equal to 1; generating at least one link file, where the at least one link file is used to identify the N storage areas; obtaining N groups of configuration data; respectively storing the N groups of configuration data into the N storage areas; and generating a target machine code based on the at least one link file, where the at least one link file is used to identify the N storage areas.

The storage area of the second memory is divided into storage areas whose quantity is the same as a quantity of configuration data groups, and one group of configuration data is stored in each storage area. At least one link file that identifies the N storage areas may also be generated. In this way, an address and a size of each storage area in a corresponding storage area may be fixed, so that the configuration data can be obtained subsequently by simply using the link file.

With reference to the fifth aspect, in some implementations of the fifth aspect, the storage method further includes: determining that an $n^{th}$ storage sub-area in the N storage areas includes unused storage space; and filling the unused storage space with a specific character.

Storage space that is not full in the storage area of the second memory is filled with a specific character, to prevent a stack overflow.

According to a sixth aspect, a controller upgrade apparatus is provided. A storage memory of a controller stores configuration data, the configuration data is data related to a function of the controller, and the apparatus includes: a reading unit, configured to read the configuration data; and a processing unit, configured to perform, based on the configuration data, an operation corresponding to the configuration data.

With reference to the sixth aspect, in some implementations of the sixth aspect, the configuration data includes a parameter value of a target signal and a storage address of the target signal in the controller.

With reference to the sixth aspect, in some implementations of the sixth aspect, the reading unit is configured to read the configuration data when the controller is started or restarted.

According to a seventh aspect, a controller upgrade apparatus is provided, and the apparatus includes: an obtaining unit, configured to obtain configuration data, where the configuration data is related to a function of a controller; and a processing unit, configured to generate a machine code based on the configuration data, where the machine code is used to upgrade the controller.

With reference to the seventh aspect, in some implementations of the seventh aspect, the apparatus further includes: a flashing unit, configured to flash the machine code into a storage memory of the controller.

With reference to the seventh aspect, in some implementations of the seventh aspect, the obtaining unit is configured to obtain a user instruction, where the user instruction indicates at least one of the following: adding one or more pieces of configuration data, deleting one or more pieces of configuration data, and modifying one or more pieces of configuration data.

With reference to the seventh aspect, in some implementations of the seventh aspect, the obtaining unit is further configured to obtain the user instruction based on an operation performed by a user in a human-computer interaction interface of software.

According to an eighth aspect, a readable storage medium is provided. The readable storage medium stores a program or instructions, and when the program or the instructions are executed, the method according to the third aspect or any one of some implementations of the third aspect is implemented.

According to a ninth aspect, a readable storage medium is provided. The readable storage medium stores a program or instructions, and when the program or the instructions are executed, the method according to the fourth aspect or any one of some implementations of the fourth aspect is implemented.

According to a tenth aspect, a readable storage medium is provided. The readable storage medium stores a program or instructions, and when the program or the instructions are executed, the method according to the fifth aspect or any one of some implementations of the fifth aspect is implemented.

According to an eleventh aspect, an apparatus is provided, including at least one memory and at least one processor. The at least one memory is configured to store a program, and the at least one processor is configured to run the program to implement the method according to the third aspect or any one of some implementations of the third aspect, or implement the method according to the fourth aspect or any one of some implementations of the fourth aspect, or implement the method according to the fifth aspect or any one of some implementations of the fifth aspect.

According to a twelfth aspect, a software tool is provided. The software tool is configured to implement the method according to the fourth aspect or any one of some implementations of the fourth aspect.

According to a thirteenth aspect, a vehicle is provided, including the controller according to the second aspect or any one of some implementations of the second aspect.

According to a fourteenth aspect, a vehicle is provided, including the controller upgrade apparatus according to the sixth aspect or any one of some implementations of the sixth aspect or the controller upgrade apparatus according to the seventh aspect or any one of some implementations of the seventh aspect.

According to a fifteenth aspect, a chip is provided, including at least one processor and an interface circuit. The interface circuit is configured to provide program instructions or data for the at least one processor, and the at least one processor is configured to execute the program instructions to implement the method according to the third aspect or any one of some implementations of the third aspect, or implement the method according to the fourth aspect or any one of some implementations of the fourth aspect, or implement the method according to the fifth aspect or any one of some implementations of the fifth aspect.

DESCRIPTION OF EMBODIMENTS

The following describes the technical solutions in this application with reference to the accompanying drawings.

Terms used in the following embodiments are merely intended to describe specific embodiments, but are not intended to limit this application. As used in this specification and the appended claims of this application, the singular expressions "one", "a", "the foregoing", "the", and "this" are intended to also including expressions such as "one or more", unless otherwise contrarily indicated explicitly in context of the singular expressions. It should be further understood that in the following embodiments of this application, "at least one" and "one or more" mean one, two, or more.

Reference to "an embodiment", "some embodiments", or the like described in embodiments of this application means that one or more embodiments of this application include a specific feature, structure, or characteristic described with reference to the embodiment. Therefore, statements such as "in an embodiment", "in some embodiments", "in other embodiments", and "in some other embodiments" that appear at different places in this specification do not necessarily mean referring to a same embodiment. Instead, the statements mean "one or more but not all of embodiments", unless otherwise emphasized in another manner. The terms "include", "contain", "have", and variants thereof all mean "including but are not limited to", unless otherwise emphasized in another manner.

A schematic diagram of an underlying software architecture of an AUTOSAR is described below by using FIG. 1 as an example.

Figure 1:
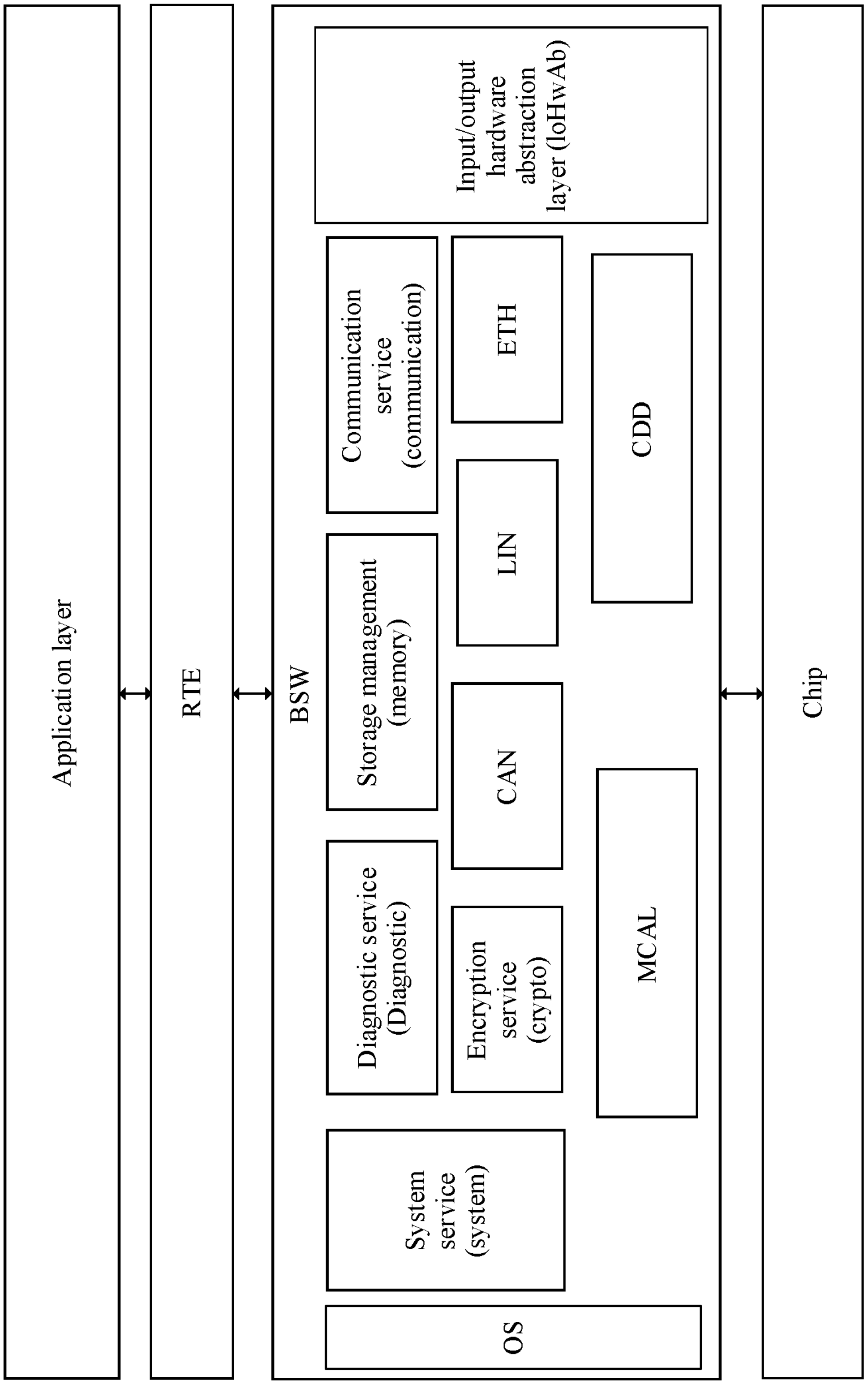
FIG. 1 is a schematic diagram of an underlying software architecture of an AUTOSAR.

As shown in FIG. 1, the software architecture of the AUTOSAR includes an application layer, a runtime environment (RTE), and a BSW.

The BSW includes an operating system (OS), a system service (system), a diagnostic service (Diagnostic), an encryption service (crypto), memory management (memory), a communication service (communication), a CAN protocol stack, a LIN protocol stack, an Ethernet protocol stack, a microcontroller abstraction layer (MCAL), a complex device driver (CDD), and an input/output hardware abstraction layer (ioHwAb).

A system module includes basic software mode management (BswM), communication mode management (ComM), electronic control unit mode management (EcuM), synchronized time-base management (StbM), diagnostic fault tracking (Det), watchdog management (WdgM), and a watchdog interface (WdgIf) (not shown in FIG. 1).

A diagnostic module includes a diagnostic communication module (Dcm), a diagnostic event management module (Dem), and a function inhibition management (FiM) (not shown in FIG. 1).

Storage management includes an electrically erasable programmable memory analog flash memory (Fee), a memory management interface (MemIf), an electrically erasable programmable memory abstraction layer (Ea), and nonvolatile memory management (NvM) (not shown in FIG. 1).

A communication module includes communication management (Com), big data communication management (LdCom), a protocol data unit router (PduR), network management (Nm), an interaction layer protocol data unit multiplexer (IpduM), an end-to-end converter (E2eXf), a communication converter (ComXf), a scalable service-oriented middleware over Internet Protocol converter (SomeIpXf), secure onboard communication (SecOC), a universal calibration protocol (XCP), and a scalable service-oriented middleware over Internet Protocol transport layer (SomeIpTp) (not shown in FIG. 1).

The CAN communication protocol stack includes a CAN interface layer (CanIf), a CAN network management module (CanNm), a CAN state management module (CanSM), a CAN transport layer module (CanTp), and a CAN time synchronization module (CanTsyn) (not shown in FIG. 1).

The LIN communication protocol stack includes a LIN interface layer (LinIf), a LIN network management module (LinNm), a LIN state management module (LinSM), and a LIN transport layer module (LinTp) (not shown in FIG. 1).

The Ethernet communication protocol stack includes an Ethernet interface layer (EthIf), a socket adapter (SoAd), UDP (user datagram protocol) network management (UdpNm), a diagnostics over Internet Protocol (DoIP), Ethernet state management (EthSM), a service discovery module (SD), an Ethernet transport layer protocol stack (TcpIp), and an Ethernet time synchronization module (EthTsyn) (not shown in FIG. 1).

The MCAL is a driver software that is directly related to hardware, and can drive a chip and provide a unified interface for the application layer, to decouple the application layer from the chip. The MCAL includes an ADC, a general purpose timer (GPT), a microcontroller kernel driver (MCU), a CAN controller driver, a digital input/output driver (DIO), a flash driver (FLS), an input capture unit (ICU), a serial peripheral interface (SPI), a chip port driver (Port), a pulse width modulation module (PWM), an Ethernet controller driver (ETH), and a LIN controller driver (not shown in FIG. 1).

The CDD is a driver module of a peripheral device on a microcontroller. The CDD provides a user with a possibility of writing special device driver software. The CDD includes a CAN bus transceiver (CanTrev), a LIN bus transceiver (LinTrcv), an Ethernet router (EthSwt), an Ethernet transceiver (EthTrcv), a watchdog (Wdg), an external electrically erasable programmable memory (EEP), an H bridge, and a high-side/low-side (HS/LS) driver (not shown in FIG. 1).

Therefore, embodiments of this application provide a controller, hardware of the controller does not need to be improved and compiling does not need to be performed (that is, compiling-free) either, and only dozens of pieces of configuration data need to be flashed into a storage memory of the controller. In this way, the controller can directly read the configuration data from the storage memory of the controller, and read, from a running memory of the controller based on the configuration data, running data corresponding to the configuration data, to develop a function of the controller. Therefore, an amount of configuration data required to complete development of the controller can decrease from hundreds to a few dozen, thereby reducing a workload of controller development, reducing development costs of the controller, and increasing a development speed of the controller.

For example, the controller may be a controller that is developed based on an MCU and that uses an operating system running on a ROM.

A field to which the controller is applied is not limited in embodiments of this application. For example, the controller may be applied to the automotive field. For example, the controller may include an ECU, a VIU, and the like.

The controller provided in embodiments of this application includes a first memory and a second memory.

The first memory is the running memory of the controller. For example, the first memory may be a random-access memory (RAM).

The second memory is the storage memory of the controller. For example, the second memory may be a ROM. For example, the second memory may be a flash memory.

In some embodiments, before delivery of the second memory, a storage area of the second memory is divided into M storage areas.

In some embodiments, corresponding configuration data may be flashed into the second memory based on a user requirement.

For example, if the configuration data includes N types of configuration data, the N types of configuration data are stored in N storage areas of the M storage areas in the second memory, where M is greater than or equal to N.

Figure 2:
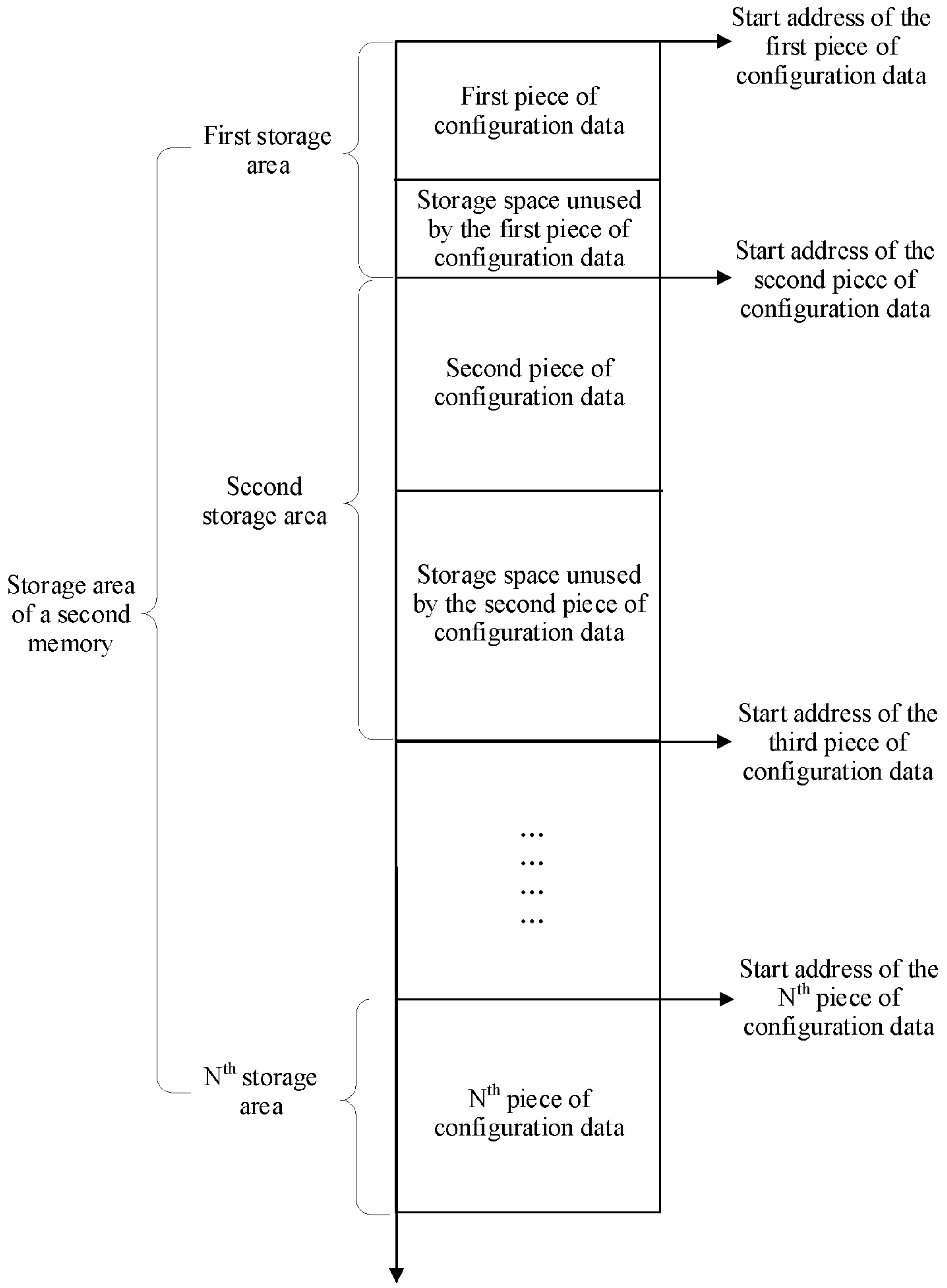
FIG. 2 is a schematic diagram of a storage area of a second memory according to an embodiment of this application.

For example, as shown in FIG. 2, the storage area of the second memory includes N storage areas: a first storage sub-area, a second storage sub-area, . . . , and an $N^{th}$ storage sub-area. The first storage sub-area stores first piece of configuration data, the second storage sub-area stores second piece of configuration data, . . . , and the $N^{th}$ storage sub-area stores $N^{th}$ piece of configuration data, that is, the N storage sub-areas respectively store N types of configuration data.

In some embodiments, storage space that is not full in the storage area of the second memory may be further filled with a specific character, to prevent a stack overflow.

For example, as shown in FIG. 2, storage space unused by the first piece of configuration data and storage space unused by the second piece of configuration data may be separately filled with a specific character.

For example, the specific character may be 0.

In addition, at least one link file that identifies the M storage areas may be further generated. In this way, an address and a size of each storage area in a corresponding storage area may be fixed, so that the configuration data can be obtained subsequently by simply using the link file.

Figure 3:
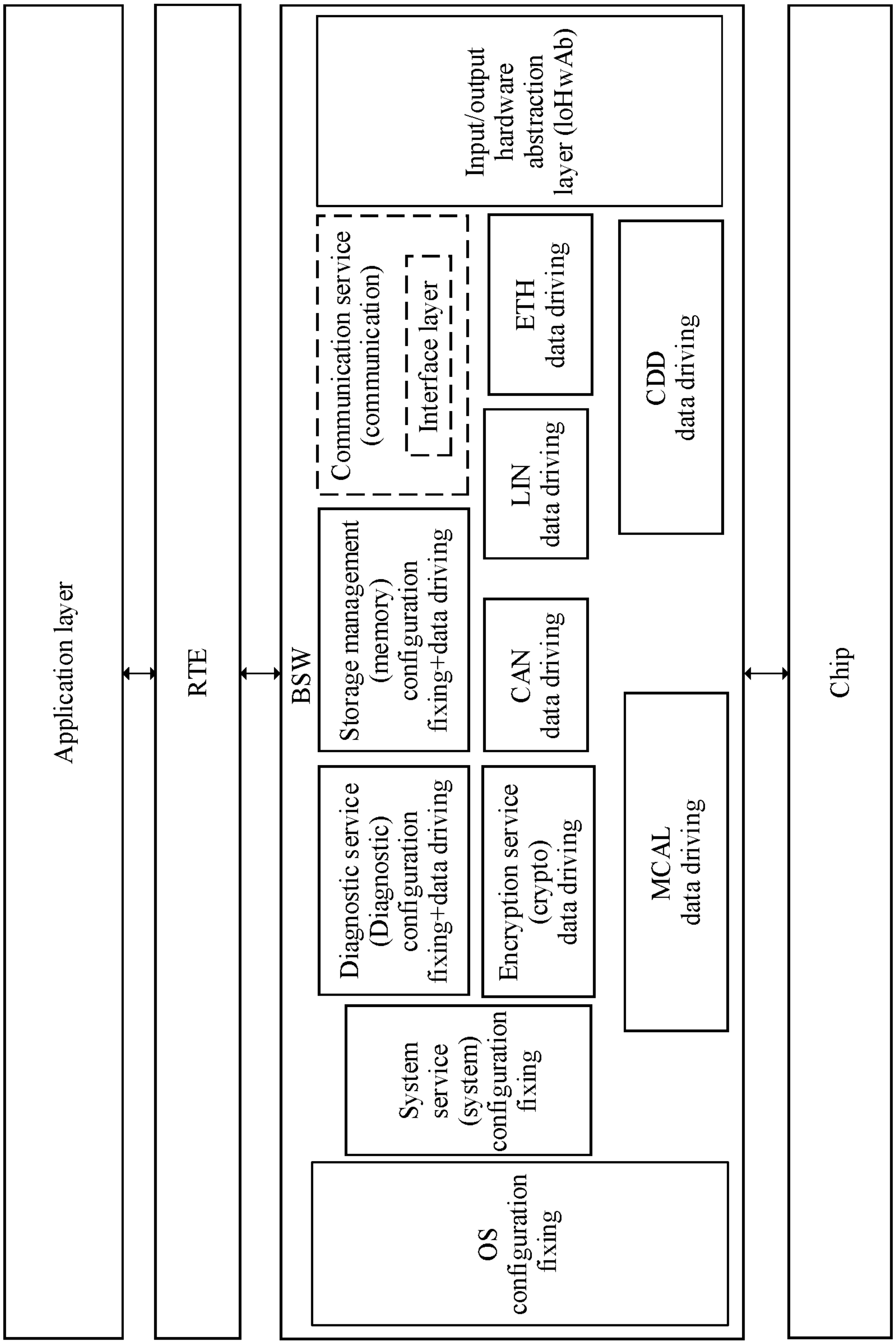
FIG. 3 is a schematic diagram of a software architecture of an example controller according to an embodiment of this application.

With reference to FIG. 3, the following describes a software architecture of the controller provided in embodiments of this application.

For example, FIG. 3 is a schematic diagram of an underlying software architecture of a controller according to an embodiment of this application.

As shown in FIG. 3, a difference between the underlying software architecture and the underlying software architecture of the AUTOSAR in FIG. 1 lies in the following: In an aspect, because hardware of the controller remains unchanged, if an initialization sequence of some system modules can be fixed, configuration fixing can be implemented without performing a change based on a requirement. In another aspect, the communication service at the basic software layer is replaced by an interface layer. In still another aspect, a data driving manner is different. When data driving is performed, configuration data is no longer read from a configuration code, and instead, the configuration data that has been flashed into the second memory is read from the second memory.

Figure 4:
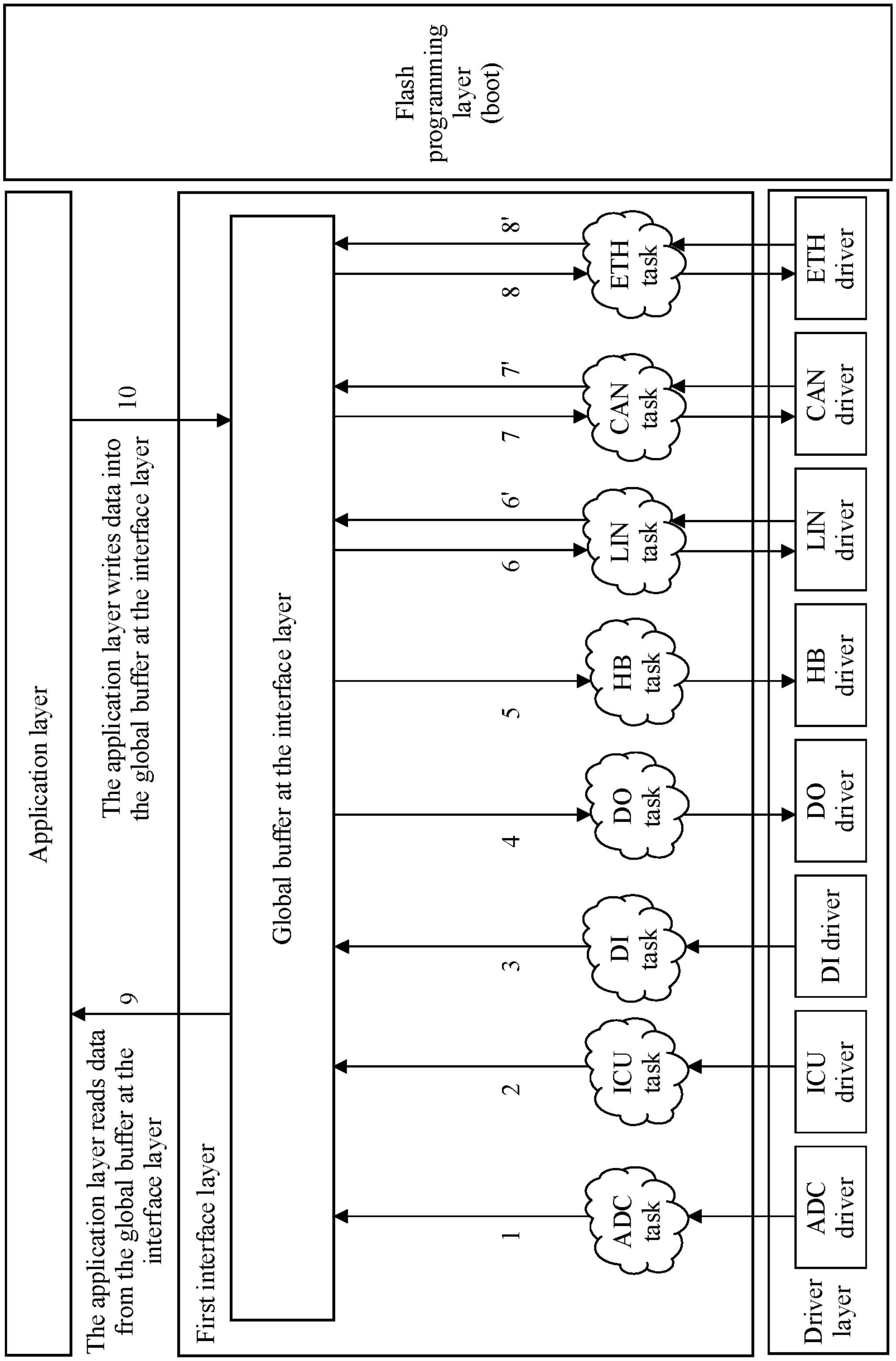
FIG. 4 is a schematic diagram of an architecture of an example interface layer according to an embodiment of this application.

With reference to FIG. 4, the following describes a software architecture of the controller provided in embodiments of this application.

For example, as shown in FIG. 4, the interface layer separately exchanges data with a driver layer and an application layer. The interface layer is between the application layer and the driver layer.

The driver layer includes a ADC driver, an ICU driver, a DI driver, a DO driver, an H bridge (HB) driver, a LIN driver, a CAN driver, and an Ethernet (ETH) driver.

The interface layer provided in this embodiment of this application includes a data plane function, a management plane function, or an initialization function.

The data plane function can configure a periodic task for software, for example, separately configure a 1-millisecond (ms) task, a 10 ms task, a 100 ms task, and a 1-second periodic task on each core/process that runs the interface layer. Each task separately queries data, in a global buffer, of the ADC, the ICU, the DI, the DO, the HB, the CAN/CANFD, the LIN, and the Ethernet to determine whether some channels need to be manipulated.

Behavior of the data plane function is defined by the configuration data stored in the second memory.

To facilitate search of the configuration data, target configurations may be managed by level. For example, configuration data related to the ADC, the ICU, the DI, the DO, the HB, the CAN/CANFD, or the LIN may be classified into three levels, and configuration data related to the Ethernet may be classified into four levels.

For example, for content specifically included in the configuration data, refer to Table 1. The configuration data shown in Table 1 is an example of the configuration data in this embodiment of this application. The content included in the configuration data is not limited in this embodiment of this application.

TABLE 1

| Level of configuration data | Type of a target signal | Configuration data |
|---|---|---|
| Level-1 configuration data | Signal transmitted through a DI, an ADC, an ICU, a DO, an HB, a CAN, a CANFD, or an Ethernet | Periodicity type of the target signal |
| Level-2 configuration data | | Periodicity of the target signal (in a unit of milliseconds)<br>Start address that is of the target signal corresponding to the periodicity and that is in the level-3 configuration data<br>Quantity of target signals |
| Level-3 configuration data | Signal transmitted through a DI, a DO, an H bridge, or an ADC | Channel number of the target signal<br>Address of the target signal in the global buffer |
| | Signal transmitted through an ICU | Channel number of the target signal<br>Sampling mode of the target signal<br>Address of the target signal in the global buffer |
| | Signal received through a CAN/CANFD | Number of a channel for receiving the target signal<br>ID of the target signal in a CAN/CANFD packet<br>Start bit of the target signal in the CAN/CANFD packet<br>Bit length of the target signal<br>Address of the target signal in the global buffer<br>First timeout threshold<br>Action performed after receiving of the target signal times out<br>Initial value of the target signal |
| | Assembled packet sent through a CAN/CANFD | Address of the target signal in the global buffer before packet assembly<br>Address of the target signal in the global buffer after packet assembly<br>Start bit of the target signal in a packet that carries the target signal<br>Bit length of the target signal<br>Big-endian/little-endian flag bit of the target signal |
| | Packet sent through a CAN/CANFD | CAN channel and/or CANFD channel that carries the target signal<br>ID of the target signal<br>Byte length of the target signal<br>Start address of the target signal in the global buffer |
| | Signal received through a LIN | Number of a channel that carries the target signal<br>Protected identifier (PID) of a LIN packet that carries the target signal<br>Start bit of the target signal in the LIN packet |

TABLE 1-continued

| Level of configuration data | Type of a target signal | Configuration data |
|---|---|---|
| | | Bit length of the target signal<br>Address of the target signal in the global buffer |
| | Assembled packet sent through a LIN | Address of the target signal in the global buffer before packet assembly<br>Address of the target signal in the global buffer after packet assembly<br>Start bit of the target signal in a LIN packet that carries the target signal<br>Bit length of the target signal |
| | Packet sent through a LIN | LIN channel that carries the target signal<br>Address of the target signal in the global buffer, that is, a PID of the target signal<br>Byte length of the target signal in a target<br>Start address of the target signal in the global buffer |
| | Target signal sent through an Ethernet | Protocol data unit (PDU) ID of an Ethernet packet that carries the target signal<br>Start address that is of the target signal included in the Ethernet packet and that is in the level-4 configuration data<br>Quantity of target signals |
| Level-4 configuration data | Target signal sent through an Ethernet | Address of the target signal in a global buffer of a target device<br>Address of the target signal in a local global buffer<br>Byte length of the target signal |

As shown in Table 1, the level-1 configuration data is the same as the level-2 configuration data. The level-1 configuration data includes the periodicity type of the target signal. The level-2 configuration data includes at least one of the following: the periodicity of the target signal, the start address that is of the target signal corresponding to the periodicity and that is in the level-3 configuration data, and the quantity of target signals.

The periodicity type may be understood as a quantity of periodicities. For example, if the periodicity type is 3, and the periodicity separately includes 10 ms, 20 ms, and 50 ms, there are three periodicities for reading the target signal.

As shown in Table 1, when a to-be-collected target signal is the signal transmitted through the DI channel, the signal transmitted through the DO channel, the signal transmitted through the ADC channel, or the signal transmitted through the HB, the level-3 configuration data includes the channel number of the target signal and/or the address of the target signal in the global buffer.

As shown in Table 1, when a to-be-collected target signal is the signal transmitted through the ICU, the level-3 configuration data includes at least one of the following: the channel number of the target signal, the sampling mode of the target signal, and the address of the target signal in the global buffer.

For example, the sampling mode may be understood as information that needs to be collected. For example, the sampling mode may include collecting an input frequency, collecting a duty cycle, and collecting data on a rising edge/falling edge.

As shown in Table 1, when a to-be-collected target signal includes the signal received through the CAN and/or the signal received through the CANFD, the level-3 configuration data includes at least one of the following: the number of the channel for receiving the target signal; the ID of the target signal in the CANFD packet, where the CAN packet includes the target signal, and the CANFD packet includes the target signal; the start bit of the target signal in the CAN/CANFD packet; the bit length of the target signal; the address of the target signal in the global buffer; the first timeout threshold, where the first timeout threshold indicates a threshold for determining that receiving of the target signal times out; the action performed after receiving of the target signal times out; and the initial value of the target signal.

The initial value of the target signal may be understood as an initial value of the target signal when the controller is started or restarted (which may also be referred to as that the controller is just powered on).

As shown in Table 1, when a to-be-collected target signal includes the assembled packet sent through the CAN and/or the assembled packet sent through the CANFD, the level-3 configuration data includes at least one of the following: the address of the target signal in the global buffer before packet assembly, the address of the target signal in the global buffer after packet assembly, the start bit of the target signal in the packet that carries the target signal, the bit length of the target signal, and the big-endian/little-endian flag bit of the target signal.

The start bit of the target signal in the packet that carries the target signal may be understood as a location or an address of the target signal in the packet that carries the target signal.

Little-endian means storing a low-order bit at a start address (low address), and big-endian mode means storing a high-order bit at the start address (low address).

As shown in Table 1, when a to-be-collected target signal includes the packet sent through the CAN, the level-3 configuration data includes at least one of the following: the CAN channel and/or the CANFD channel that carries the target signal, the ID of the target signal, the byte length of the target signal, and the start address of the target signal in the global buffer.

As shown in Table 1, when a to-be-collected target signal includes the signal received through the LIN, the level-3 configuration data includes at least one of the following: the number of the channel that carries the target signal, the PID of the LIN packet that carries the target signal, the start bit of the target signal in the LIN packet, the bit length of the target signal, and the address of the target signal in the global buffer.

As shown in Table 1, when a to-be-collected target signal includes the assembled packet sent through the LIN, the level-3 configuration data includes at least one of the following: the address of the target signal in the global buffer before packet assembly, the address of the target signal in the global buffer after packet assembly, the start bit of the target signal in the LIN packet that carries the target signal, and the bit length of the target signal.

As shown in Table 1, when a to-be-collected target signal includes the packet sent through the LIN, the level-3 configuration data includes at least one of the following: the LIN channel that carries the target signal, the PID of the target signal, the byte length of the target signal, and the start address of the target signal in the global buffer.

As shown in Table 1, when a to-be-collected target signal includes the signal sent through the Ethernet, the level-3 configuration data includes at least one of the following: the PDU ID of the Ethernet packet that carries the target signal, the start location that is of the target signal included in the Ethernet packet and that is in the level-4 configuration data, and the quantity of target signals; and the level-4 configuration data includes at least one of the following: the address of the target signal in the global buffer of the target device, an address of the local (which may be understood as the controller in this embodiment of this application) global buffer in which the target signal is located, and the byte length of the target signal.

The address of the target signal in the global buffer of the target device may be understood as an address of the target signal in the global buffer of the target device after the target signal is transmitted to the target device.

Optionally, levels of the level-1 configuration data, the level-2 configuration data, the level-3 configuration data, and the level-4 configuration data are in ascending order.

It can be learned that the content included in the configuration data may be classified into two types: A first type is a storage address of the target signal in the global buffer, and a second type is a parameter value of the target signal. The parameter value of the target signal may include content, in Table 1, other than the storage address of the target signal in the global buffer.

The management plane function monitors a running status of the interface layer, so that when the interface layer runs abnormally, the interface layer takes an exception response measure.

For example, if a 5-millisecond periodic task is configured for the data plane function, the management plane function determines whether the signal received through the CAN/CANFD times out, and if the signal times out, takes an exception response measure based on the action that is performed after receiving of the target signal times out and that is indicated in the level-3 configuration data, to recover normal running of the interface layer. In addition, if the configuration data indicates a data recovery moment, data may be recovered at the corresponding moment.

For example, if a 5-millisecond periodic task is configured for the data plane function, the management plane function may process a scheduling table of the LIN, for example, determine whether the scheduling table is switched, and send or receive a LIN packet based on configuration of the scheduling table.

The initialization function is configured to initialize a communication parameter used during running of the interface layer.

For example, for the CAN/CANFD, the communication parameter may include a baud rate and initial values of all signals.

At the MCAL, all channels of the CAN controller are set to support the CANFD, and several common CAN/CANFD baud rates are preconfigured. The initialization function can set a corresponding channel to the CAN or the CANFD based on the configuration of the baud rate.

For example, for the LIN, the initialization function includes setting a LIN baud rate and loading information about a scheduling table into the global buffer.

For example, for the Ethernet, the initialization function needs to read a configured MAC address, IP addresses of a local device and a target device, and port numbers of the local device and the target device. During running, the Ethernet receives/sends a packet based on this.

The following describes running of layers in the software architecture of the controller provided in embodiments of this application.

In embodiments of this application, the layers included in the software architecture of the controller run on a second memory. In a running process, generated data is buffered in a first memory.

The software architecture includes an interface layer, an application layer, a driver layer, and a global buffer. The interface layer may exchange data with the application layer through the global buffer. The interface layer may further exchange data with the driver layer through the global buffer. In other words, this can be understood as that, the global buffer is a link between the interface layer and the application layer, and is also a link between the interface layer and the driver layer. A specific process of data exchange may include the following steps S1 to S5. The following describes the steps in detail.

In S1 to S5, in some embodiments, a first layer may be the interface layer, and a second layer may be the application layer. In some other embodiments, the first layer may be the application layer, and the second layer may be the interface layer.

S1: The first layer reads configuration data.

That the first layer reads configuration data may be understood as that the first layer reads the configuration data from the second memory.

S2: The first layer performs a first target operation based on a parameter value of a target signal.

The parameter value of the target signal is described above, and details are not described herein again.

For example, the first target operation may be collecting the target signal.

S3: The first layer buffers a result of the first target operation into the global buffer based on a storage address of the target signal in the global buffer.

For example, the result of the first target operation may be the collected target signal.

S4: The second layer obtains the result of the first target operation.

Further, the second layer may read the configuration data, and read the result of the first target operation from the global buffer based on the address of the target signal in the global buffer.

In some embodiments, when a user needs to modify a function of the controller, that is, when controller software needs to be upgraded, the user may, for example, input a user instruction by using an operation in a human-computer interaction interface of software (target software described below), where the user instruction indicates at least one of the following: adding one or more pieces of configuration data, deleting one or more pieces of configuration data, and modifying one or more pieces of configuration data. The software may generate a machine code based on configuration data indicated by the user instruction. A flash programming layer of the controller may flash the machine code into the second memory, to modify the configuration data in the controller.

When the controller is started (powered on), if the user changes the function of the controller, that is, the configuration data in the second memory is changed, in a possible implementation, the controller needs to be restarted, so that the controller reads the configuration data in the second memory again. When the controller is not started (not powered on), if the user changes the function of the controller, that is, the configuration data in the second memory is changed, in a possible implementation, the controller needs to be started only when the controller is used. In other words, this may be understood as that, in a possible implementation, only when the controller is started or restarted (powered on) each time, the controller reads the configuration data stored in the second memory.

For example, the user may add one or more pieces of configuration data to the second memory, delete one or more pieces of configuration data from the second memory, and/or modify one or more pieces of configuration data in the second memory.

In some embodiments, the interface layer may further perform a second target operation based on the result of the first target operation.

For example, the second target operation may be forwarding the target signal.

From a perspective of the application layer, behavior of an underlying module in the underlying software architecture provided in this embodiment of this application is consistent with that of the original AUTOSAR. To be specific, a same output can be obtained in a case of a same input, so that the application layer can seamlessly switch from the original AUTOSAR architecture to the software architecture provided in this embodiment of this application. The following describes, with reference to different application scenarios, a running process of each layer in the software architecture of the controller (the controller is applied to the automotive field) provided in this embodiment of this application.

Tasks in the following may include a periodic task, and may also include an event task.

In some embodiments, the first layer is the interface layer shown in FIG. 4, and the second layer is the application layer shown in FIG. 4. In this case, the running process of each layer in the software architecture of the controller may be divided into two processes: First, the interface layer writes data into the global buffer; and then, the application layer needs to read, from the global buffer, the data written by the interface layer.

In an example, when there is an ADC task, where the ADC task may be, for example, collecting a brake input value through an ADC channel, first, the interface layer needs to write the ADC task into the global buffer; and then, the application layer needs to read, from the global buffer, the ADC task written by the interface layer.

Further, first, the interface layer may read, from the second memory, a periodicity of collecting the braking input value, a number of a channel for collecting the braking input value, an address in which the braking input value is stored in the global buffer after being collected, and the like (an example of the configuration data); collect the braking input value (an example of performing the first target operation) through the ADC channel (a channel corresponding to a corresponding ADC driver at the driver layer) based on the periodicity of collecting the braking input value and the number of the channel for collecting the braking input value (an example of the parameter value of the target signal); and buffer the collected braking input value (an example of the result of the first target operation) into the global buffer based on the address in which the braking input value is stored in the global buffer after being collected. In other words, the interface layer writes the collected braking input value (an example of the result of the first target operation) into the global buffer (as shown by an arrow 1 in FIG. 4). Then, the application layer may read, from the second memory, the address in which the braking input value is stored in the global buffer after being collected; and read the collected braking input value (an example of the result of the first target operation) from the global buffer based on the address in which the braking input value is stored in the global buffer after being collected. In other words, the application layer reads the collected braking input value from the global buffer (as shown by an arrow 9 in FIG. 4).

In addition, the interface layer may further forward the collected braking input value to another device (an example of the second target operation) through a LIN/CAN/ETH (as shown by an arrow 6'/an arrow 7'/an arrow 8' in FIG. 4).

In another example, when there is an ICU task, where the ICU task may be, for example, collecting a parameter or the like of an input voltage (for example, a frequency of the input voltage, a duty cycle of the input voltage, or an edge count of the input voltage) of the controller through an ICU channel, first, the interface layer needs to write the ICU task into the global buffer; and then, the application layer needs to read, from the global buffer, the ICU task written by the interface layer.

Further, first, the interface layer writes data into the global buffer. Further, the interface layer may read, from the second memory, a sampling mode of the parameter of the input voltage of the controller, a number of a channel for collecting the parameter of the input voltage of the controller, and an address in which the parameter of the input voltage of the controller is stored in the global buffer after being collected (an example of the configuration data); collect the parameter of the input voltage of the controller (an example of performing the first target operation) through the ICU channel (a channel corresponding to a corresponding ICU driver at the driver layer) based on the sampling mode of the parameter of the input voltage of the controller and the number of the channel for collecting the parameter of the input voltage of the controller (an example of the parameter value of the target signal); and buffer the collected parameter of the input voltage of the controller (an example of the result of the first target operation) into the global buffer based on the address in which the parameter of the input voltage of the controller is stored in the global buffer after being collected. In other words, the interface layer writes the collected parameter of the input voltage of the controller (an example of the result of the first target operation) into the global buffer (as shown by an arrow 2 in FIG. 4). Then, the application layer needs to read, from the global buffer, the data written by the interface layer. Further, the application layer may read, from the second memory, the address in which the parameter of the input voltage of the controller is stored in the global buffer after being collected; and read the collected parameter of the input voltage of the controller (an example of the result of the first target operation) from the global buffer based on the address in which the parameter of the input voltage of the controller is stored in the global buffer after being collected. In other words, the application layer reads the collected parameter of the input voltage of the controller from the global buffer (as shown by an arrow 9 in FIG. 4).

In addition, the interface layer may further forward the collected parameter of the input voltage of the controller to another device (an example of the second target operation) through a LIN/CAN/ETH (as shown by an arrow 6'/an arrow 7'/an arrow 8' in FIG. 4).

In still another example, when there is a DI task, where the DI task may be, for example, collecting a feedback signal of a solenoid valve through a DI channel, first, the interface layer needs to write the DI task into the global buffer; and then, the application layer needs to read, from the global buffer, the DI task written by the interface layer.

Further, first, the interface layer writes the data into the global buffer. Further, the interface layer may read, from the second memory, a sampling mode of the feedback signal of the solenoid valve, a number of a channel for collecting the feedback signal of the solenoid valve, an address in which the feedback signal of the solenoid valve is stored in the global buffer after being collected, and the like (an example of the configuration data); collect the feedback signal of the solenoid valve (an example of performing the first target operation) through the DI channel (a channel corresponding to a corresponding DI driver at the driver layer) based on the sampling mode of the feedback signal of the solenoid valve and the number of the channel for collecting the feedback signal of the solenoid valve (an example of the parameter value of the target signal); and buffer the collected feedback signal of the solenoid valve (an example of the result of the first target operation) into the global buffer based on the address in which the feedback signal of the solenoid valve is stored in the global buffer after being collected. In other words, the interface layer writes the collected feedback signal of the solenoid valve (an example of the result of the first target operation) into the global buffer (as shown by an arrow 3 in FIG. 4). Then, the application layer needs to read, from the global buffer, the data written by the interface layer. Further, the application layer may read, from the second memory, the address in which the feedback signal of the solenoid valve is stored in the global buffer after being collected; and read the collected feedback signal of the solenoid valve (an example of the result of the first target operation) from the global buffer based on the address in which the feedback signal of the solenoid valve is stored in the global buffer after being collected. In other words, the application layer reads the collected feedback signal of the solenoid valve from the global buffer (as shown by an arrow 9 in FIG. 4).

In addition, the interface layer may further forward the collected feedback signal of the solenoid valve to another device (an example of the second target operation) through a LIN/CAN/ETH (as shown by an arrow 6'/an arrow 7'/an arrow 8' in FIG. 4).

In still another example, when there is a first LIN/CAN/ETH task, where the first LIN/CAN/ETH task may be, for example, receiving a packet sent by another device (which is referred to as a received packet below for ease of description) and/or sending a packet to another device (which is referred to as a sent packet below for ease of description), first, the interface layer may write the first LIN/CAN/ETH task into the global buffer; and then, the application layer may read, from the global buffer, the first LIN/CAN/ETH task written by the interface layer. The following describes a specific implementation process by using an example in which the first LIN/CAN/ETH task is a received packet. For whether the first LIN/CAN/ETH task is the received packet or a sent packet, only the received packet described below needs to be replaced by the sent packet. Details are not described herein.

Further, first, the interface layer writes data into the global buffer. Further, the interface layer may read, from the second memory, a channel number of the received packet, an ID of the received packet, a byte length of the received packet, an address in which the received packet is stored in the global buffer after being collected, and the like (an example of the configuration data); receive the packet through a LIN/CAN/ETH channel (a channel corresponding to a corresponding LIN/CAN/ETH driver at the driver layer) based on the channel number of the received packet, the ID of the received packet, and the byte length of the received packet (an example of the parameter value of the target signal), and split the received packet (an example of performing the first target operation) into one or more parsed signals; and buffer the one or more parsed signals (an example of the result of the first target operation) into the global buffer based on the address in which the received packet is stored in the global buffer after being collected. In other words, the interface layer writes, into the global buffer, the one or more parsed signals (an example of the result of the first target operation) obtained after the received packet is split (as shown by an arrow 6'/an arrow 7'/an arrow 8' in FIG. 4). Then, the application layer needs to read, from the global buffer, the data written by the interface layer. Further, the application layer may read, from the second memory, the address in which the received packet is stored in the global buffer after being collected; and read, from the global buffer based on the address in which the received packet is stored in the global buffer after being collected, the one or more parsed signals (an example of the result of the first target operation) obtained through splitting. In other words, the application layer reads, from the global buffer, the one or more parsed signals obtained through splitting (as shown by an arrow 9 in FIG. 4).

In addition, the interface layer may further forward, through another LIN/CAN/ETH based on a configured communication matrix, the one or more parsed signals obtained through splitting to another device (an example of the second target operation) (as shown by an arrow 6'/an arrow 7'/an arrow 8' in FIG. 4).

In still another example, when there is a second LIN/CAN/ETH task, where the second LIN/CAN/ETH task may be, for example, receiving a first request message of another device through a LIN/CAN/ETH, and the first request message requests to change an output value of a first DO/HB channel, for example, the first request message may carry a changed output value of the first DO/HB channel, first, the interface layer needs to write the second LIN/CAN/ETH task into the global buffer; and then, the application layer needs to read, from the global buffer, the second LIN/CAN/ETH task written by the application layer.

Further, first, the interface layer may read, from the second memory, a periodicity of collecting the changed output value of the first target DO/HB channel, a number of a channel for collecting the changed output value of the first target DO/HB channel, an address in which the changed output value of the first target DO/HB channel is stored in the global buffer after being collected, and the like (an example of the configuration data); collect the changed output value of the first target DO/HB channel (an example of performing the first target operation) through a DO/HB channel (a channel corresponding to a corresponding DO/HB driver at the driver layer) based on the periodicity of collecting the changed output value of the first target DO/HB channel and the number of the channel for collecting the changed output value of the first target DO/HB channel (an example of the parameter value of the target signal); and buffer the collected changed output value of the first target DO/HB channel (an example of the result of the first target operation) into the global buffer based on the address in which the changed output value of the first target DO/HB channel is stored in the global buffer after being collected. In other words, the interface layer writes the collected changed output value of the first target DO/HB channel (an example of the result of the first target operation) into the global buffer (as shown by an arrow 6'/an arrow 7'/an arrow 8' in FIG. 4). Then, the application layer may read, from the second memory, the address in which the changed output value of the first target DO/HB channel is stored in the global buffer after being collected; and read, based on the address in which the changed output value of the first target DO/HB channel is stored in the global buffer after being collected, the collected changed output value of the first target DO/HB channel (an example of the result of the first target operation) from the global buffer. In other words, the application layer reads the collected changed output value of the first target DO/HB channel from the global buffer (as shown by an arrow 9 in FIG. 4).

In addition, the interface layer may determine whether the changed output value of the first target DO/HB channel in the global buffer is consistent with a current output value of the first target DO/HB channel (an example of the second target operation); and if the changed output value of the first target DO/HB channel in the global buffer is inconsistent with the current output value of the first target DO/HB channel, control the first target DO/HB channel, so that an output value of the first target DO/HB channel is the changed output value of the first target DO/HB channel; or if the changed output value of the first target DO/HB channel in the global buffer is consistent with the current output value of the first target DO/HB channel, the interface layer may not need to take any measure.

In some other embodiments, the first layer is the application layer shown in FIG. 4, and the second layer is the interface layer shown in FIG. 4.

First, the application layer writes data into the global buffer. Then, the interface layer needs to read, from the global buffer, the data written by the application layer.

DO/HB Task

In another example, when there is a DO/HB task, where the DO/HB task may be, for example, that the application layer requests to change an output value of a second target DO/HB channel, first, the application layer needs to write the DO/HB task into the global buffer; and then, the application layer needs to read, from the global buffer, the DO/HB task written by the interface layer.

Further, in an example, first, the application layer may read, from the second memory, a periodicity of collecting the changed output value of the second target DO/HB channel, a number of a channel for collecting the changed output value of the second target DO/HB channel, an address in which the changed output value of the second target DO/HB channel is stored in the global buffer after being collected, and the like (an example of the configuration data); collect the changed output value of the second target DO/HB channel (an example of performing the first target operation) through a DO/HB channel (a channel corresponding to a corresponding DO/HB driver at the driver layer) based on the periodicity of collecting the changed output value of the second target DO/HB channel and the number of the channel for collecting the changed output value of the second target DO/HB channel (an example of the parameter value of the target signal); and buffer the collected changed output value of the second target DO/HB channel (an example of the result of the first target operation) into the global buffer based on the address in which the changed output value of the second target DO/HB channel is stored in the global buffer after being collected. In other words, the application layer writes the collected changed output value of the second target DO/HB channel (an example of the result of the first target operation) into the global buffer (as shown by an arrow 10 in FIG. 4). Then, the interface layer may read, from the second memory, the address in which the changed output value of the second target DO/HB channel is stored in the global buffer after being collected; and read, based on the address in which the changed output value of the second target DO/HB channel is stored in the global buffer after being collected, the collected changed output value of the second target DO/HB channel (an example of the result of the first target operation) from the global buffer. In other words, the interface layer reads the collected changed output value of the second target DO/HB channel from the global buffer (as shown by an arrow 4/an arrow 5 in FIG. 4).

In addition, the interface layer may determine whether the changed output value of the second target DO/HB channel in the global buffer is consistent with a current output value of the second target DO/HB channel (an example of the second target operation); and if the changed output value of the second target DO/HB channel in the global buffer is inconsistent with the current output value of the second target DO/HB channel, control the second target DO/HB channel, so that an output value of the second target DO/HB channel is the changed output value of the second target DO/HB channel; or if the changed output value of the second target DO/HB channel in the global buffer is consistent with the current output value of the second target DO/HB channel, the interface layer may not need to take any measure.

Figure 5:
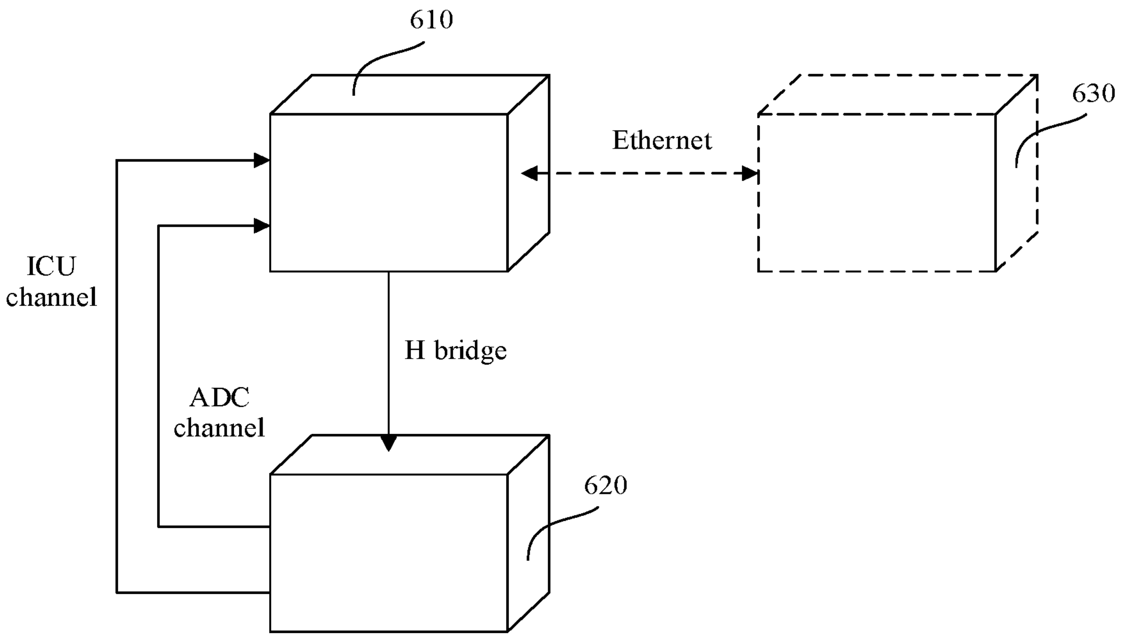
FIG. 5 is a schematic diagram of an example application scenario according to an embodiment of this application.
Figure 6:
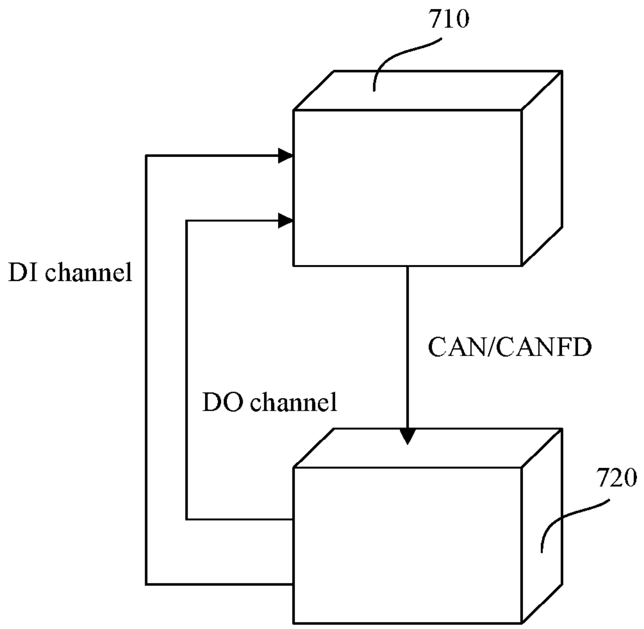
FIG. 6 is a schematic diagram of another example application scenario according to an embodiment of this application.

The following uses two application scenarios shown in FIG. 5 and FIG. 6 as examples to describe a process of controlling another device by a controller.

For example, as shown in FIG. 5, a controller 610 and a vehicle seat 620 are included. Based on a user requirement, after delivery of the controller 610, a function of the controller 610 needs to be newly added, to be specific, the controller 610 needs to be capable of controlling movement of the vehicle seat 620. In other words, the controller 610 needs to be developed, so that the controller 610 can control movement of the vehicle seat 620.

According to the controller described above, in this case, the configuration data shown in Table 1 needs to be flashed into a second memory of the controller 610. A motor of the vehicle seat 620 needs to be controlled by the controller 610 through an H bridge, and the vehicle seat 620 needs to feed back a pulse width modulation (PWM) signal and an ADC signal to the controller 610, to prevent overcurrent and ensure precise control of movement, where the PWM signal is transmitted through an ICU, and the ADC signal is transmitted through an ADC channel. Therefore, in this case, in the configuration data in the second memory, configuration data related to the H bridge, configuration data related to the ICU, and configuration data related to the ADC have corresponding values, and all other configuration data corresponds to 0.

For example, the configuration data related to the H bridge may include a channel number of a signal transmitted through the H bridge, a periodicity of controlling the signal transmitted through the H bridge, and an address allocated in a global buffer to the signal transmitted through the H bridge.

For example, the configuration data related to the ICU may include a channel number of a signal transmitted through the ICU, a periodicity of reading the signal transmitted through the ICU, a sampling mode, and an address allocated in the global buffer to the signal transmitted through the ICU.

For example, the configuration data related to the ADC may include a channel number of a signal transmitted through the ADC, a periodicity of reading the signal transmitted through the ADC, and an address allocated in the global buffer to the signal transmitted through the ADC.

First, a user inputs the configuration data to target software, the target software converts the configuration data into a machine code, and a flash programming layer (a flash programming layer shown in FIG. 4) of the controller 610 flashes the machine code into the second memory, so that the controller 610 controls the vehicle seat 620. Then, a control algorithm may be flashed into the controller 610 (630) by using the flash programming layer (as shown in FIG. 4) of the controller 610. In this way, an application layer of the controller 610 may send a control instruction, and the application layer of the controller 610 may read configuration data from the second memory, and store, based on the configuration data (the configuration data related to the H bridge), the control instruction in an address that is in the global buffer and that is indicated by the configuration data. An interface layer of the controller 610 may read the configuration data from the second memory, read the control instruction from the second memory based on the address that is in the global buffer and that is indicated by the configuration data, convert the control instruction into an H bridge control signal through the H bridge, and send the H bridge control signal to the vehicle seat 620. Finally, the vehicle seat 620 moves based on the control signal.

Optionally, the vehicle seat 620 may alternatively transmit a movement feedback result (the PWM signal and the ADC signal) to the controller 610 through the ADC channel and the ICU. Subsequently, the interface layer of the controller 610 may read configuration data from the second memory, and read the received feedback result from an address that is in the global buffer and that is indicated by the configuration data (the configuration data related to the ADC or the ICU).

Optionally, in some embodiments, due to a limitation of a wire harness in the entire vehicle and to reduce wire harnesses, a controller 630 may be added. In this case, both the configuration data and the control algorithm are deployed on the controller 630. The controller 610 may serve as an intermediate medium for information transmission between the controller 630 and the vehicle seat 620, to implement a process of controlling the vehicle seat 620 by the controller 630. Information may be transmitted between the controller 620 and the controller 610 through an ETH.

Further, for a process of deploying the configuration data and the control algorithm on the controller 630, refer to the foregoing related description of deploying the configuration data and the control algorithm on the controller 610. Details are not described herein again. The controller 630 may send a control instruction, and transmit the control instruction to the controller 610 through, for example, the ETH. The interface layer of the controller 610 may read configuration data (configuration data related to the ETH) from the second memory, and read the control instruction from an address that is in the global buffer and that is indicated by the configuration data, so that the controller 620 obtains the control instruction. In this case, in the configuration data, the configuration data related to the ETH has a corresponding value. For a process after the controller 620 obtains the control instruction, refer to the foregoing description. Details are not described herein again.

Further, the controller 610 may send a movement feedback result to the controller 630 through, for example, the ETH.

For example, the configuration data related to the ETH may include an assembled PDU ID, a sending periodicity, and an address of a global buffer of a target device (namely, the controller 630).

Optionally, the controller 630 may be disposed in a place in which the controller 630 is not prone to be damaged or a place that is conducive to heat dissipation in the entire vehicle. For example, the controller 630 may be disposed at four corners of the entire vehicle.

For example, as shown in FIG. 6, a controller 710 and a controller 720 are included. Based on a user requirement, after delivery of the controller 710, a function of the controller 710 needs to be newly added, to be specific, the controller 710 needs to be capable of controlling the controller 720. In other words, the controller 710 needs to be developed, so that the controller 710 can control the controller 720.

According to the controller described above, in this case, the configuration data shown in Table 1 needs to be flashed into a second memory of the controller 710. If the controller 720 needs the controller 710 to supply power to the controller 720 by using a high-side/low-side driver, and the controller 720 needs to communication with the controller 710 through a CAN/CANFD, the controller 720 further feeds back some general-purpose input/output (GPIO) signals to the controller 710. Therefore, in this case, in the configuration data in the second memory, configuration data related to the CAN/CANFD, configuration data related to a DO, and configuration data related to a DI have corresponding values, and all other configuration data correspond to 0.

For example, the configuration data related to the CAN/CANFD may include a baud rate, an initial value of a signal transmitted through the CAN/CANFD, a channel number of the signal transmitted through the CAN/CANFD, a periodicity of sending/receiving the signal transmitted through the CAN/CANFD, a CAN ID, a first timeout threshold, the signal transmitted through the CAN/CANFD, and an address allocated in a global buffer to the signal transmitted through the CAN/CANFD.

For example, the configuration data related to the DO (that is, information about the high-side/low-side driver) may include a channel number of a signal transmitted through DO, a periodicity of controlling the signal transmitted through the DO, and an address allocated in the global buffer to the signal transmitted through the DO.

For example, the configuration data related to the DI may include a channel number of a signal transmitted through DI, a periodicity of reading the signal transmitted through the DI, and an address allocated in the global buffer to the signal transmitted through the DI.

First, a user inputs the configuration data to target software, the target software converts the configuration data into a machine code, and a flash programming layer of the controller 710 flashes the machine code into the second memory, so that the controller 710 controls the controller 720. Then, a control algorithm may be flashed into the controller 710 by using the flash programming layer (as shown in FIG. 4) of the controller 710. In this way, an application layer of the controller 710 may send an electrical signal, and the application layer of the controller 710 may read configuration data from the second memory, and store, based on the configuration data, the electrical signal in an address that is in the global buffer and that is indicated by the configuration data (the configuration data related to the CAN/CANFD). An interface layer of the controller 710 may read the configuration data from the second memory, read the electrical signal from the second memory based on the address that is in the global buffer and that is indicated by the configuration data (the configuration data related to the CAN/CANFD), and send the electrical signal to the controller 720 through the CAN/CANFD. Finally, the controller 720 works based on the electrical signal. In this way, a process of controlling the controller 720 by the controller 710 is implemented.

Optionally, the controller 720 may alternatively transmit a GPIO signal to the controller 710 through a DI channel. Subsequently, the interface layer of the controller 720 may read configuration data from the second memory, and read the GPIO signal from an address that is in the global buffer and that is indicated by the configuration data (the configuration data related to the DI channel).

Optionally, in some embodiments, due to a limitation of a wire harness in the entire vehicle and to reduce wire harnesses, a controller may be added. Both the configuration data and the control algorithm are deployed on the newly added controller, and the newly added controller may serve as an intermediate medium for information transmission between the controller 710 and the controller 720, to implement a process of controlling the controller 720 by the newly added controller. Information may be transmitted between the newly added controller and the controller 720 through an ETH.

Further, for a process of deploying the configuration data and the control algorithm on the newly added controller, refer to the foregoing related description of deploying the configuration data and the control algorithm on the controller 710. Details are not described herein again. The newly added controller may send a control instruction, and transmit the control instruction to the controller 710 through, for example, the ETH. The interface layer of the controller 710 may read configuration data (configuration data related to the ETH) from the second memory, and read the control instruction from an address that is in the global buffer and that is indicated by the configuration data, so that the controller 710 obtains the control instruction. In this case, in the configuration data, the configuration data related to the ETH has a corresponding value. For a process after the controller 710 obtains the control instruction, refer to the foregoing description. Details are not described herein again.

Further, the controller 610 may send a movement feedback result to the controller 630 through, for example, the ETH.

The following can be learned from the foregoing processes of controlling another device by the controllers in FIG. 5 and FIG. 6: First, based on the controller provided in embodiments of this application, a same set of hardware may be used for different projects and different customers, so that costs are reduced. Second, an amount of configuration data in the underlying software of the controller is greatly decreased to a few dozen, so that a test workload is reduced and a speed of developing controller software is increased. Third, underlying software configuration of the controller can be flexibly switched based on a user requirement, and has low dependency on a traditional AUTOSAR configuration tool, so that part suppliers and vehicle manufacturers can save large amount of money for purchasing the AUTOSAR tool.

The controller in embodiments of this application is described above with reference to FIG. 1 to FIG. 6. Apparatuses in embodiments of this application are described below with reference to FIG. 7 and FIG. 9.

Figure 7:
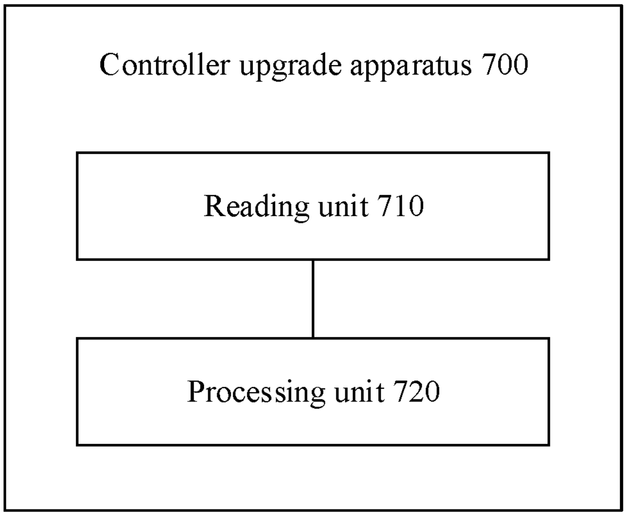
FIG. 7 is a schematic diagram of a structure of an example controller software upgrade apparatus according to an embodiment of this application.

FIG. 7 is a schematic diagram of a structure of an example controller upgrade apparatus according to an embodiment of this application.

As shown in FIG. 7, the controller upgrade apparatus 700 may include a reading unit 710 and a processing unit 720. A storage memory of a controller stores configuration data, and the configuration data is data related to a function of the controller. The controller upgrade apparatus 700 includes: the reading unit 710, configured to read the configuration data; and the processing unit 720, configured to perform, based on the configuration data, an operation corresponding to the configuration data.

Optionally, the configuration data includes a parameter value of a target signal and a storage address of the target signal in the controller.

Optionally, the reading unit 710 is configured to read the configuration data when the controller is started or restarted.

Figure 8:
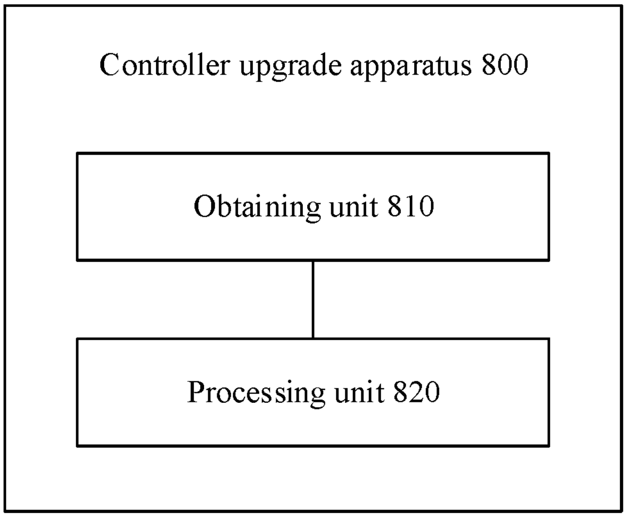
FIG. 8 is a schematic diagram of a structure of another example controller upgrade apparatus according to an embodiment of this application.

FIG. 8 is a schematic diagram of a structure of another example controller upgrade apparatus according to an embodiment of this application.

As shown in FIG. 8, the controller upgrade apparatus 800 may include an obtaining unit 810 and a processing unit 820. The controller upgrade apparatus 800 includes: the obtaining unit 810, configured to obtain configuration data, where the configuration data is related to a function of a controller; and the processing unit 820, configured to generate a machine code based on the configuration data, where the machine code is used to upgrade the controller.

Optionally, the controller upgrade apparatus 800 further includes: a flashing unit, configured to flash the machine code into a storage memory of the controller.

Optionally, the obtaining unit 810 is configured to obtain a user instruction, where the user instruction indicates at least one of the following: adding one or more pieces of configuration data, deleting one or more pieces of configuration data, and modifying one or more pieces of configuration data.

Optionally, the obtaining unit 810 is further configured to obtain the user instruction based on an operation performed by a user in a human-computer interaction interface of software.

Figure 9:
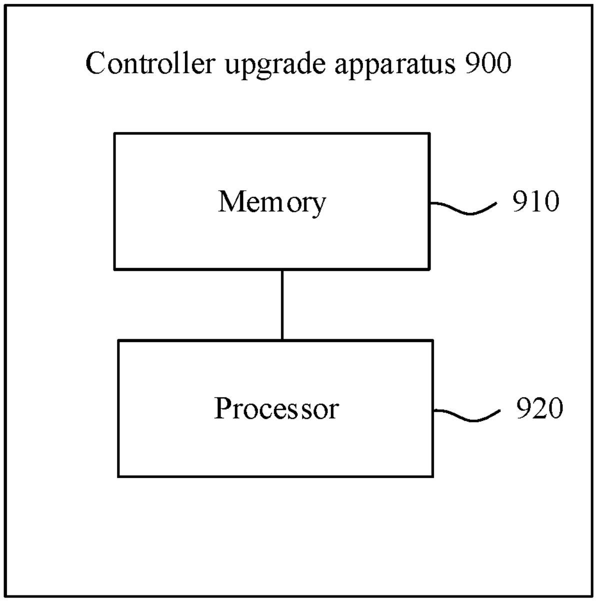
FIG. 9 is a schematic diagram of a structure of a controller upgrade apparatus according to an embodiment of this application.

FIG. 9 is a schematic diagram of a structure of a controller upgrade apparatus 900 according to an embodiment of this application. The controller upgrade apparatus 900 includes at least one memory 410 and at least one processor 420. The at least one memory 410 is configured to store a program, and the at least one processor 420 is configured to run the program to implement the technical solutions in this application.

It should be understood that, the processor in embodiments of this application may be a central processing unit (CPU). The processor may alternatively be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that, the memory in embodiments of this application may be a volatile memory or a nonvolatile memory, or may include both a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM, and is used as an external cache. Through example but not limitative description, many forms of RAM are available, for example, a static random access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a direct rambus random-access memory (DR RAM).

An embodiment of this application further provides a computer-readable storage medium. The computer-readable storage medium has program instructions. When the program instructions are directly or indirectly executed, the technical solutions in this application are implemented.

An embodiment of this application further provides a computer program product including instructions. When the computer program product is run on a computing device, the computing device is enabled to perform the technical solutions in this application, or the computing device is enabled to implement functions of the controller described above.

An embodiment of this application further provides a chip, including at least one processor and an interface circuit. The interface circuit is configured to provide program instructions or data for the at least one processor, and the at least one processor is configured to execute the program instructions, to implement the technical solutions in this application.

An embodiment of this application further provides a vehicle, including the controller designed in embodiments of this application.

Terms such as "component", "module", and "system" used in this specification indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside in a process and/or an execution thread, and a component may be located on one computer and/or distributed between two or more computers. In addition, these components may be executed from various computer-readable media that store various data structures. For example, the components may perform communication by using a local process and/or a remote process and based on a signal having one or more data packets (for example, data from two components interacting with another component in a local system, a distributed system, and/or across a network such as the Internet interacting with another system by using the signal).

A person of ordinary skill in the art may be aware that, the units and the algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A skilled person may use different methods to implement the described functions for each particular application, but this implementation should not be considered as beyond the scope of this application.

It may be clearly understood by a person skilled in the art that, for convenient and brief description, for specific working processes of the system, apparatus, and unit described above, refer to corresponding processes in the foregoing method embodiments. Details are not described herein again.

In the several embodiments provided in this application, it should be understood that the disclosed system, apparatus, and method may be implemented in other manners. For example, the apparatus embodiments described above are merely examples. For example, division of the units is merely logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the function is implemented in a form of a software functional unit and sold or used as an independent product, the function may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:

a driver layer;

an application layer;

a global buffer; and an interface layer configured to:

exchange configuration data with the application layer through the global buffer;

exchange the configuration data with the driver layer through the global buffer;

perform a first target operation based on a parameter value of a first target signal, wherein the parameter value comprises a collection periodicity value indicating a number of different periodic intervals for sampling the first target signal, a channel number of the first target signal, or a collection mode of sampling the first target signal; and buffer a first result of the first target operation into the global buffer based on a first storage address of the first target signal in the global buffer, wherein the application layer is configured to obtain the first result of the first target operation.

2. The apparatus of claim 1, wherein the interface layer is further configured to read the configuration data comprising the parameter value of the first target signal and the first storage address.

3. The apparatus of claim 1, wherein the application layer is further configured to read the first result of the first target operation from the global buffer based on the first storage address.

4. The apparatus of claim 3, wherein the application layer is further configured to read the configuration data comprising the parameter value of the first target signal and the first storage address.

5. The apparatus of claim 1, wherein the application layer is configured to:

perform a second target operation based on a second parameter value of a second target signal; and buffer a second result of the second target operation into the global buffer based on a second storage address of the second target signal in the global buffer, and wherein the interface layer is further configured to obtain the second result of the second target operation.

6. The apparatus of claim 5, wherein the application layer is further configured to read the configuration data comprising the second parameter value of the second target signal and the second storage address.

7. The apparatus of claim 5, wherein the interface layer is further configured to read the second result of the second target operation from the global buffer based on the second storage address of the second target signal in the global buffer.

8. The apparatus of claim 7, wherein the interface layer is further configured to read the configuration data comprising the second parameter value of the second target signal and the second storage address.

9. The apparatus of claim 1, wherein the interface layer is further configured to perform a second target operation based on the first result of the first target operation.

10. The apparatus of claim 9, wherein the first result of the first target operation comprises a collected target signal, and the second target operation comprises forwarding the first target signal.

11. The apparatus of claim 1, further comprising a flash programming layer configured to:

obtain a machine code; and flash the machine code into a storage memory of a controller to modify the configuration data.

12. The apparatus of claim 1, wherein the interface layer comprises a management plane function configured to monitor a running status of the interface layer such that when the interface layer runs abnormally, the interface layer is configured to take an exception response measure.

13. The apparatus of claim 1, wherein the interface layer comprises an initialization function configured to initialize a communication parameter used during running of the interface layer.

14. The apparatus of claim 1, wherein the application layer further comprises a data plane function operated by the configuration data.

15. The apparatus of claim 1, further comprising a basic software layer (BSW), and wherein the interface layer is configured to perform a communication service of the BSW.

16. The apparatus of claim 9, wherein the first result of the first target operation comprises a target output value that is a changed output value of a target driving channel at the driver layer, and the second target operation comprises changing an output value of the target driving channel to the target output value.

17. A method, comprising:

exchanging, by an interface layer, configuration data with an application layer through a global buffer;

exchanging, by the interface layer, the configuration data with a driver layer through the global buffer;

performing, by the interface layer, a target operation based on a parameter value of a target signal, wherein the parameter value comprises a collection periodicity value indicating a number of different periodic intervals for sampling the target signal, a channel number of the target signal, or a collection mode of sampling the target signal; and buffering, by the interface layer, a result of the target operation into the global buffer based on a first storage address of the target signal in the global buffer, wherein the application layer is configured to obtain the result of the target operation.

18. The method of claim 17, further comprising reading, by the interface layer, the configuration data comprising the parameter value of the target signal and the first storage address.

19. A non-transitory computer-readable medium storing instructions that, upon execution by a processor, cause an apparatus to:

exchange, by an interface layer, configuration data with an application layer through a global buffer;

exchange, by the interface layer, the configuration data with a driver layer through the global buffer;

perform, by the interface layer, a target operation based on a parameter value of a target signal, wherein the parameter value comprises a collection periodicity value indicating a number of different periodic intervals for sampling the target signal, a channel number of the target signal, or a collection mode of sampling the target signal; and buffer, by the interface layer, a result of the target operation into the global buffer based on a first storage address of the target signal in the global buffer, wherein the application layer is configured to obtain the result of the target operation.

20. The non-transitory computer-readable medium of claim 19, wherein the instructions, upon further execution by the processor, further cause the apparatus to read, by the interface layer, the configuration data comprising the parameter value of the target signal and the first storage address.

* * * * *